United States Patent
Srivastav (10) Patent No.: US 9,419,964 B2
(45) Date of Patent: Aug. 16, 2016

(54) SHARING BETWEEN CPE AND COMPANION DEVICE

(71) Applicant: Cisco Technology Inc., San Jose, CA (US)

(72) Inventor: Vivek Srivastav, Suwanee, GA (US)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 14/315,973

(22) Filed: Jun. 26, 2014

(65) Prior Publication Data

US 2015/0381606 A1    Dec. 31, 2015

(51) Int. Cl.
*G06F 7/04* (2006.01)
*H04L 29/06* (2006.01)
*G06F 17/30* (2006.01)
*H04L 29/08* (2006.01)
(Continued)

(52) U.S. Cl.
CPC ...... *H04L 63/0823* (2013.01); *G06F 17/30864* (2013.01); *G06F 21/31* (2013.01); *G06F 21/33* (2013.01); *H04L 9/3263* (2013.01); *H04L 12/28* (2013.01); *H04L 12/2809* (2013.01); *H04L 63/102* (2013.01); *H04L 67/143* (2013.01); *H04L 67/16* (2013.01); *H04W 12/08* (2013.01); *H04W 84/12* (2013.01); *H04L 2012/2849* (2013.01)

(58) Field of Classification Search
None
See application file for complete search history.

(56) References Cited

U.S. PATENT DOCUMENTS

| 6,892,307 B1 | 5/2005 | Wood et al. |
| 7,225,256 B2 | 5/2007 | Villavicencio |

(Continued)

FOREIGN PATENT DOCUMENTS

| WO | 2004/027538 | 4/2004 |
| WO | WO 2008/017008 A2 | 2/2008 |

OTHER PUBLICATIONS

D. Hardt (ed.), "The OAuth 2.0 Authorization Framework," Internet Engineering Task Force, Request for Comments 6749 (IETF Trust, Oct. 2012).

(Continued)

*Primary Examiner* — Brandon Hoffman
(74) *Attorney, Agent, or Firm* — Hahn Loeser & Parks, LLP (57) ABSTRACT

In one embodiment, a method and system for a companion device to share an application context and authorization context with a consumer premises equipment (CPE) device is described. The method and system includes transmitting a search request by a search request transmitter using a service discovery protocol, receiving a response to the search request from the CPE device, creating an authorization context at an authorization context creating processor, the authorization context including metadata that grants access to a resource, transmitting, by an authorization context transmitter, the authorization context to an application resident on the CPE device, establishing a trusted session between the application resident on the CPE and a device application, the establishing a session by the device application including requesting a digital certificate from the CPE, receiving the digital certificate from the CPE, and validating the digital certificate, creating, at an application context data creating processor, application context data, and transmitting the application context data created to the CPE device, wherein the application context data enables the CPE device to request access to an authorized resource from a resource provider. Related methods, systems, and apparatus are also described.

20 Claims, 11 Drawing Sheets

(51) Int. Cl.
   *G06F 21/31*    (2013.01)
   *G06F 21/33*    (2013.01)
   *H04L 9/32*     (2006.01)
   *H04L 12/28*    (2006.01)
   *H04W 12/08*    (2009.01)
   *H04W 84/12*    (2009.01)

(56) References Cited

U.S. PATENT DOCUMENTS

| | | |
|---|---|---|
| 7,412,720 B1 | 8/2008 | Frey et al. |
| 7,685,631 B1 | 3/2010 | Paya et al. |
| 7,836,493 B2 | 11/2010 | Xia et al. |
| 2007/0150603 A1 | 6/2007 | Crull et al. |
| 2009/0217320 A1* | 8/2009 | Aldrey ............................ 725/37 |
| 2011/0219229 A1* | 9/2011 | Cholas et al. ................. 713/168 |
| 2012/0011567 A1* | 1/2012 | Cronk et al. ..................... 726/4 |
| 2014/0173753 A1 | 6/2014 | Sanso et al. |

OTHER PUBLICATIONS

Oct. 16, 2015 ISR and Written Opinion of ISA for PCT/IB2015/054542.

Menezes, et al., *Handbook of Applied Cryptography*, 1997, CRC Press LLC, USA pp. 543-590.

* cited by examiner

SHARING BETWEEN CPE AND COMPANION DEVICE

FIELD OF THE INVENTION

The present invention generally relates to systems and methods for sharing an application and authorization context between a consumer premises equipment (CPE) device and software running on companion device.

BACKGROUND OF THE INVENTION

Typically, an IP enabled device which comprises consumer premises equipment (CPE) requires authorization credentials to access resources from a resource provider. Services such as Facebook® and YouTube® require the user's credentials in order to enable access to these resources. The client application usually caches the authorization in form of an "access_token" so the user does not need to enter the login id and password every time she wants to access a resource from the resource provider's web site.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method and system for a companion device to share an application context and authorization context with a consumer premises equipment (CPE) device, the method and system comprising transmitting a search request by a search request transmitter using a service discovery protocol, receiving a response to the search request from the CPE device, creating an authorization context at an authorization context creating processor, the authorization context including metadata that grants access to a resource, transmitting, by an authorization context transmitter, the authorization context to an application resident on the CPE device, establishing a trusted session between the application resident on the CPE and a device application, the establishing a session by the device application including requesting a digital certificate from the CPE, receiving the digital certificate from the CPE, and validating the digital certificate, creating, at an application context data creating processor, application context data, and transmitting the application context data created to the CPE device, wherein the application context data enables the CPE device to request access to an authorized resource from a resource provider. Related methods, systems, and apparatus are also described.

Exemplary Embodiment

Figure 1A:
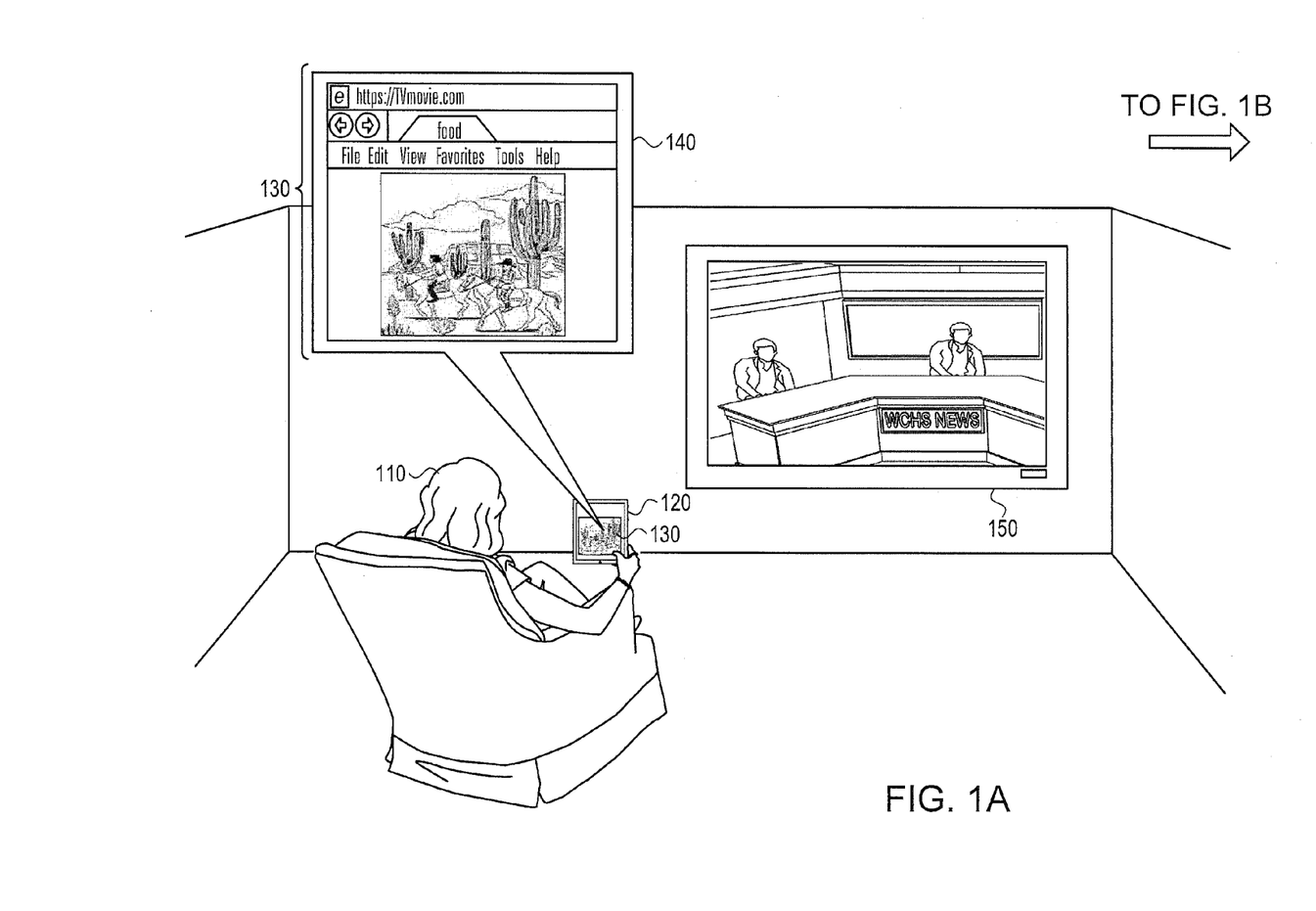
FIGS. 1A and 1B are simplified pictorial illustrations of a user of a system for sharing application and authorization context between a consumer premises equipment (CPE) device and companion device, the system constructed and operative in accordance with an embodiment of the present invention.
Figure 1B:
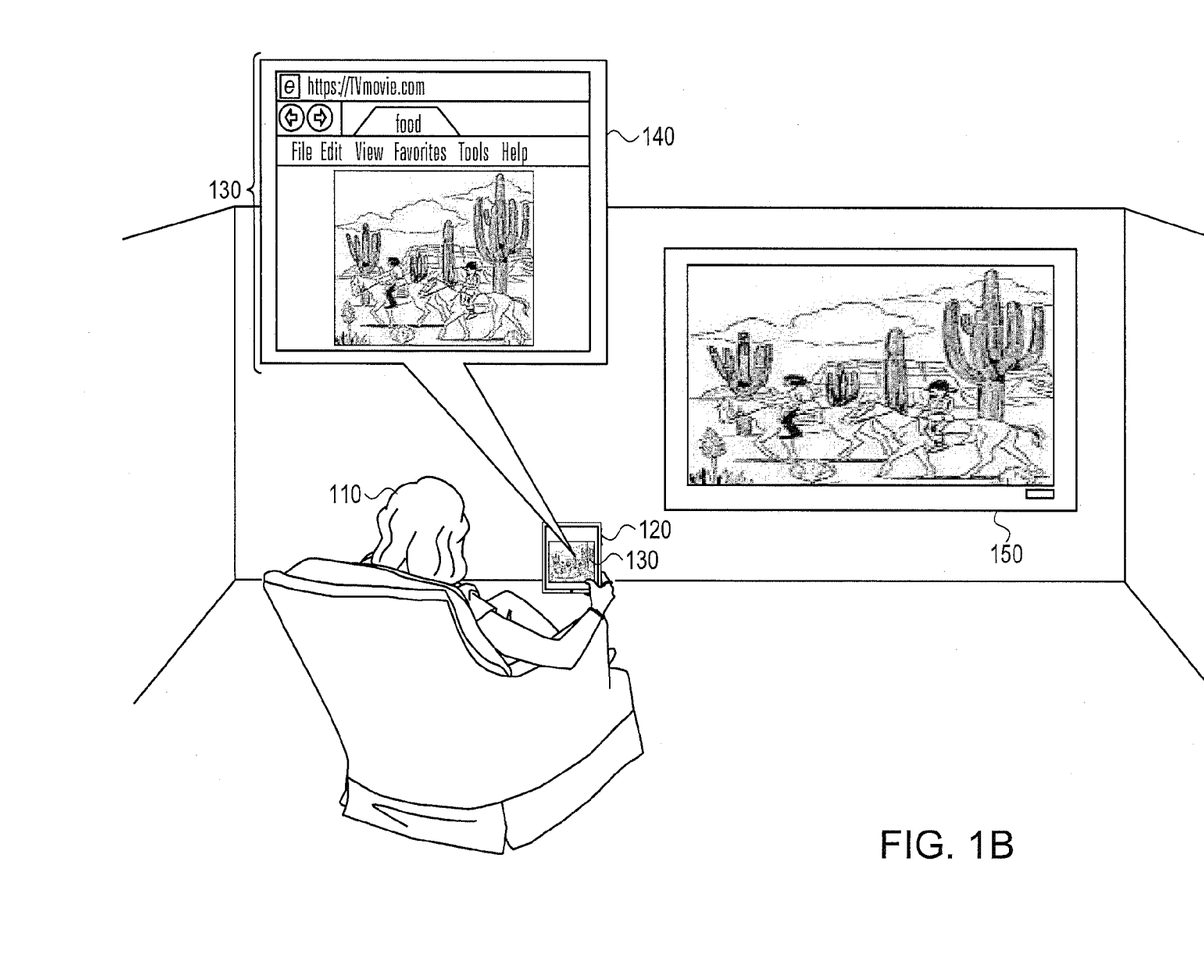

Reference is now made to FIGS. 1A and 1B which are simplified pictorial illustrations of a user of a system for sharing application and authorization context between a consumer premises equipment (CPE) 150 device and companion device, the system constructed and operative in accordance with an embodiment of the present invention. A user 110 is using a companion device 120 to view a content item 130. It is appreciated that the content item may comprise a game, a video clip or movie, streaming audio or video, an audio file, a website, or any other appropriate content item which may be viewed on a companion device 120, as is known in the art. Companion devices 120 may be any suitable computing devices such as smartphones, tablets, laptops or personal computers, etc.

As was noted above, the usual practice is to present a virtual keyboard and password screen on the CPE 150 monitor and have the user enter the details via the virtual keyboard. There are several acknowledged problems with this:

If the CPE 150 is installed in a public place, the userID and password may be compromised when the password is entered on the CPE monitor.

Entry of the userID and password may be complicated if the users have to press several navigation keys for selection of characters.

The user needs to sign-on individually on each device (i.e. each companion device 120 and the CPE 150) and there is no notion of a single or unified sign on, i.e., if the user has signed on to Facebook®, YouTube®, or a similar resource provider service on a companion device, the user still needs to individually sign-into the CPE 150 device by providing the userID and password. For example, if the user is signed in to access resources from a resource provider on a handheld device, the user will need to independently again go through the authentication and authorization sequence on the CPE 150 device. That is to say that the CPE 150 requires independent authorization of the user on the device which is different from the authorization of a user on the companion device. Furthermore, the system described herein provides a way to unify resources authorization grant on the companion device and at least one other companion device through a single authentication sequence.

Multiple users from their respective companion devices typically cannot perform a user context switch quickly on the CPE 150 device within an in-home network. For example a first person may be logged in on the CPE 150 and accessing her resource, while a second person wants to login and switch context to access his resource. In current implementations, the first person needs to log out and then the second person needs to provide his credentials (userID and password) again.

In the depiction of FIG. 1A, the user 110 is viewing a movie at the website TVmovie.com on an appropriate application 140 (see below, with reference to FIG. 1B) running on the companion device 120. For example, and without limiting the generality of the foregoing, the application 140 may comprise a web browser, a dedicated media playing application, or a dedicated application which communicates directly with a resource provider. The application 140 may also include an operating system service or a hardware enabled service. Examples of such applications would include, but not be limited to an application 140 which uses resources from Facebook® services, resources from YouTube® service, resources from Instagram® services, and so forth, as are well known.

The CPE 150 device, in this particular case, is depicted as a television monitor. The television may itself comprise a CPE device which provides it with an operating system, appropriate hardware and software, as well as an application layer that provides application context switching and resource sharing from a companion device for display on the television monitor, or, alternatively, the television monitor may be connected to a CPE device which provides it with audio, video, or other resources which are required for displaying content on the television monitor, as well as computing power. The television/CPE device 150 is displaying a newscaster. That is to say, the CPE device 150 is not displaying the content from TVmovie.com, which is displayed on the companion device 120.

After the transition from the FIG. 1A to FIG. 1B, the display of the CPE device 150 has changed, and is now displaying the same content item, that is, the movie at the website TVmovie.com on the TV mediated by the application 135 running on the companion device 120. The movie in the present example is continuing from the same point where it was on the companion device 120.

An implicit trust is assumed between the application 140 running on the companion device 120 and an application running on the CPE device 150 to enable sharing of an authorization grant and application context. This implicit trust enables the authorization grant, obtained through interaction of the application 140 running on the companion device 120 and the resource provider, to be shared with the CPE device application 150.

It is appreciated that two applications are considered to "implicitly trust" each other without a need for explicit verification of shared communication, if their communications protocol is coordinated and synchronized between them. When two applications implicitly trust one another, the data received from one is accepted by the other without need for additional verification of the data. Implicit trust may be established by using a proprietary communications protocol, sharing a secret between the two applications, or any other appropriate manner known in the art.

This authorization grant and the application context that is transferred from the companion device 120 enables the CPE device 150/TV application to access the resource on behalf of the authenticated and authorized resource provider (for example, the content provider or owner). The authorization grant can be in form of a unique data construct or handle that can be exchanged for an access_token, or it could be any other data construct that the resource provider requires to identify the resource provider and explicit resources access granted by this resource provider.

The CPE device 150 will use an access token to control access to securable objects and to control the ability of a user to perform various system-related operations on a local computing device. In the present specification, the term "access_token" may appear in the context of various data elements which are transferred within the system. It is appreciated that the term "access_token" is used to refer to the specific data construct, while the term "access token" is used to refer to the concept represented by that data structure. In general, the two terms, "access token" and "access_token" are understood to be referring to the same item.

By way of example, the user 110 goes to a doctor's office and while waiting wants to play a movie from his "resource provider" such as Netflix® on a large screen the doctor's office has in the waiting area. The user 110 discovers, after connecting to public WiFi in the doctor's office and launching application 140 running on the companion device 120 on his handheld device, that the CPE device 150/television providing the large screen in the doctor's office supports the application context switching feature for accessing the resource provider's authorized resource from the same resource provider for displaying the content on the large screen. The user logs in to his account on the companion device 120, after the authorization is received from the resource provider, the transient authorization construct and application context (asset metadata, current position, other context information etc.) is "delivered" to an application (sometimes referred to hereinafter as "the app") running on a set top box (STB) attached to the "large screen" in the doctor's office. The STB-application, exchanges the authorization construct with the access-token and then requests authorized resources from the "Resource Provider" to start streaming the movie on the large screen. The STB streams the content directly from the "Resource Provider" and not from the handheld device. When the user closes this app, or when he moves out of the WiFi range, the STB-app closes the stream and discards the Resource Provider issued transient resource authorization.

Figure 1C:
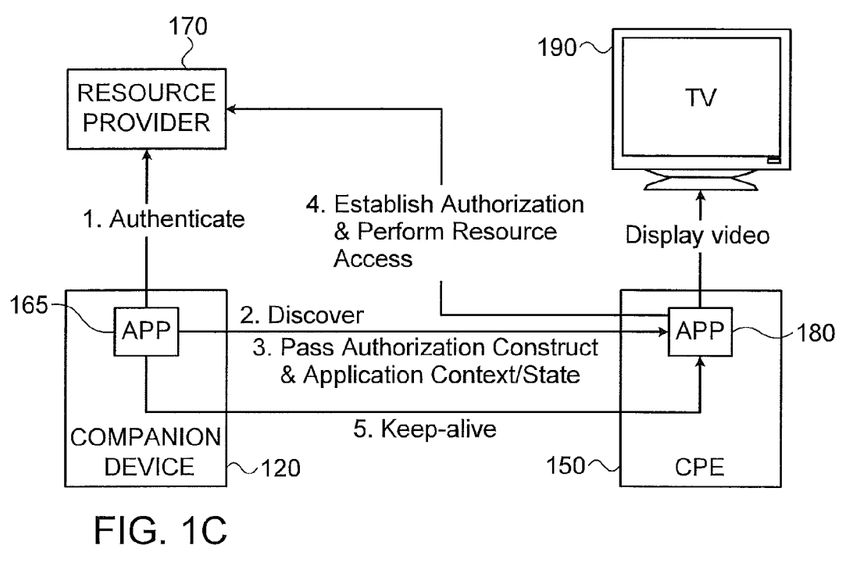
FIG. 1C is a block diagram depicting a high level view of the system in use in FIG. 1A.

Reference is now made to FIG. 1C, which is a block diagram depicting a high level view of the system in use in FIG. 1A. The system of FIG. 1C comprises a companion device 120 which comprises an application ("app") 165. The app 165 is in communication with, and authenticated by (step 1), a resource provider 170, which, in response to the resource provider's authentication via the app 165, provides the app 165 with access to the authorized resources.

The companion device 120 performs a search (step 2) in order to discover available CPE devices 150. The system depicted in FIG. 1C may comprise more than one CPE device 150. However, for ease of depiction, only one of the CPE devices 150 is shown in FIG. 1C. At least one of the CPE devices 150 has a CPE device app 180 corresponding to companion device app 165. The companion device app 165 passes (step 3) an access-token to the CPE device app 180. The companion device app 165 passes an authorization construct and the app's 165 context and state in order to access the resource provided by resource provider 170.

Resource provider 170, having received the access-token from the CPE device app 180 then establishes authorization and provides access to the requested resource to the CPE device app 180 (step 4). The CPE device app 180 is then able to use the CPE display, such as TV 190, to display the authorized resource as long as the connection between the companion device app 165 and the CPE device app 180 is maintained (step 5).

In the system of FIG. 1C, an application context is shared between two different devices (i.e. companion device 120 and CPE device 150) using a conventional security mechanism between the two devices. The two devices are expected to run applications developed by the same "application provider" or applications that implicitly trust each other. These applications exchange information using any conventional mechanism (SSL, client-cert, basic authorization over HTTPS, etc.).

Once the exchange of information occurs between the two devices, the application running on the second device (i.e CPE device 150) becomes context aware of the context available on the first device (i.e. companion device 120). Any of the conventional mechanisms can be used to determine the length of the "shared context" time.

By way of example, the companion device 120 may maintain an open socket on the CPE device 150 or may continuously send a keep-alive signal to the CPE device 150. Since, these two "apps" (one running on companion device 120 and other running on CPE device 150) communicate with the same resource provider 170, they can share the "app-Id" and "app-key" that may be needed to access a resource on behalf of a user from a remote "resource provider". Thus, the companion device 120 can off-board some operation/aspects of the application to the CPE device 150 and play the role of a second-screen.

It is appreciated that this functionality is enabled in the "application layer" rather than "protocol" layer. Since, the "application context" sharing happens at the "application layer", the applications are free to use any security mechanism between the two devices.

Figure 2:
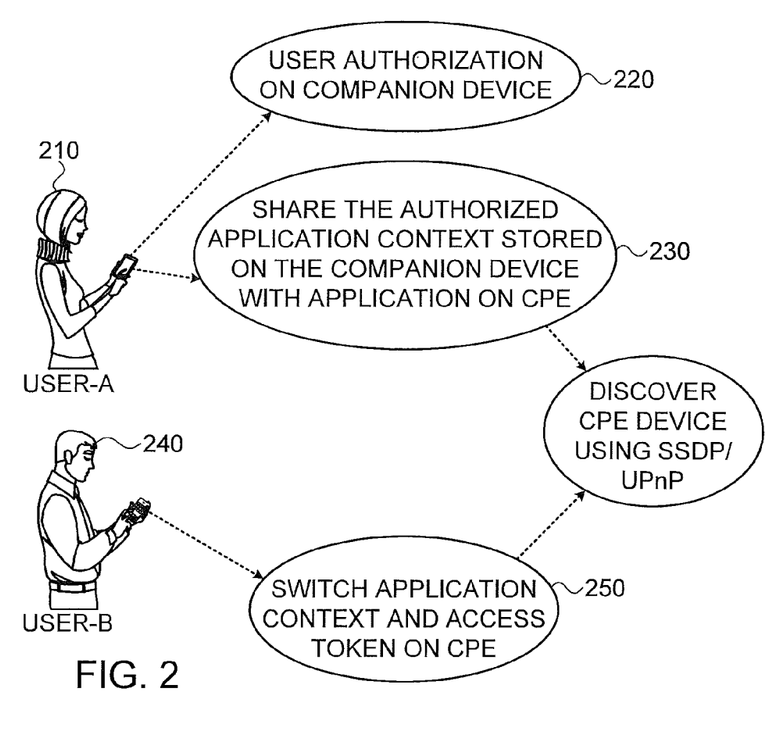
FIG. 2 is a use case diagram depicting a simplified set of use cases in which the system of FIG. 1C may be used.

Reference is now made to FIG. 2, which is a use case diagram depicting a simplified set of use cases in which the system of FIG. 1C may be used. In a first use case, User A 210 seeks user authorization (use case 220) to use a remote service on the companion device 120. This use case 220 is described below in greater detail, with reference to FIG. 4.

In a second use case 230, User A 210 shares the current application, which is now authorized on the companion device 120, and its context with the CPE device 150. This second use case 230 is described below in greater detail, with reference to FIG. 5.

In a third use case 250, User B 240 takes control of the CPE device 150 by switching the application context and access token on the CPE device 150. The CPE device 150 now will display the application 165 running on the companion device 120 of User B 240. This third use case 250 is described below in greater detail, with reference to FIG. 6.

It is appreciated that, in each of the following discussions of various use cases, device discovery is not described in detail, as the process of device discovery is based on the standard SSDP (Simple Service Discovery Protocol)/UPNP (Universal Plug and Play) protocol.

Figure 3:
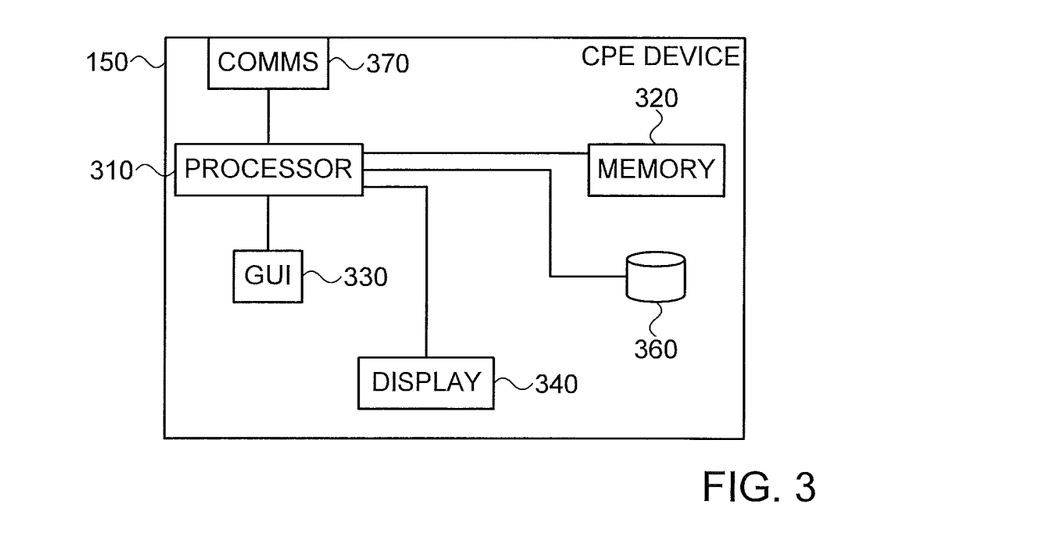
FIG. 3 is a block diagram illustration of the CPE device of the system of FIG. 1C.

Reference is now made to FIG. 3, which is a block diagram illustration of the CPE device 150 of the system of FIG. 1C.

The CPE device 150 comprises at least one processor 310, and may comprise more than one processor 310. One of the processors 310 may be a special purpose processor operative to perform the steps according to the method described herein. For example, the processor 310 may execute the steps required for creating authorization context, establishing trust, creating application context data, and so forth. In addition, the CPE device 150 comprises non-transitory computer-readable storage media (i.e. memory) 320. The memory 320 may store instructions, which at least one of the processors 310 may execute, in order to perform the steps of the method described herein. CPE device 150 also comprises typical and standard hardware and software components as are known in the art.

In addition, the CPE device 150 may comprise a user interface (typically a graphical user interface, GUI) 330 which enables a user 110 of the CPE device 150 to interact with the CPE device 150. Typical interactions may include, but not be limited to, commands to start and stop the playing of content, to scroll forward and backwards through the playing content (at faster than regular playing speeds), and to increase or decrease the audio volume.

The CPE device 150 also comprises a display 340, on which content items appear (i.e. are rendered) to the user. The CPE device 150 may also comprise storage 360, in addition to other typical and standard hardware and software components as are known in the art.

The CPE device 150 further comprises communication ports 370, including, but not limited to, ports for any of: IP communications (wired and/or wireless), Bluetooth, IR, and other appropriate protocols as are well known in the art. The CPE device 150 communication ports 370 enable, in embodiments of the present invention, communications between the CPE device 150 and the companion device 120, and between the CPE device 150 and the resource provider (i.e. transmitters and receivers, as are known in the art).

Although not illustrated in a figure, persons of skill in the art will appreciate that many of the components of the CPE device 150 depicted in FIG. 3 have corresponding components in the companion device 120 (FIG. 1A). That is to say that the companion device also comprises at least one processor, memory, storage, a GUI, and communication ports. It is also appreciated that one of the processors may be a special purpose processor operative to perform the steps according to the method described herein. Additionally, the memory may store instructions, which at least one of the processors may execute, in order to perform the steps of the method described herein. It is also appreciated that the communication ports are operative to act as various transmitters/receivers mentioned explicitly or implicitly as being used in the method and system described herein.

Figure 4:
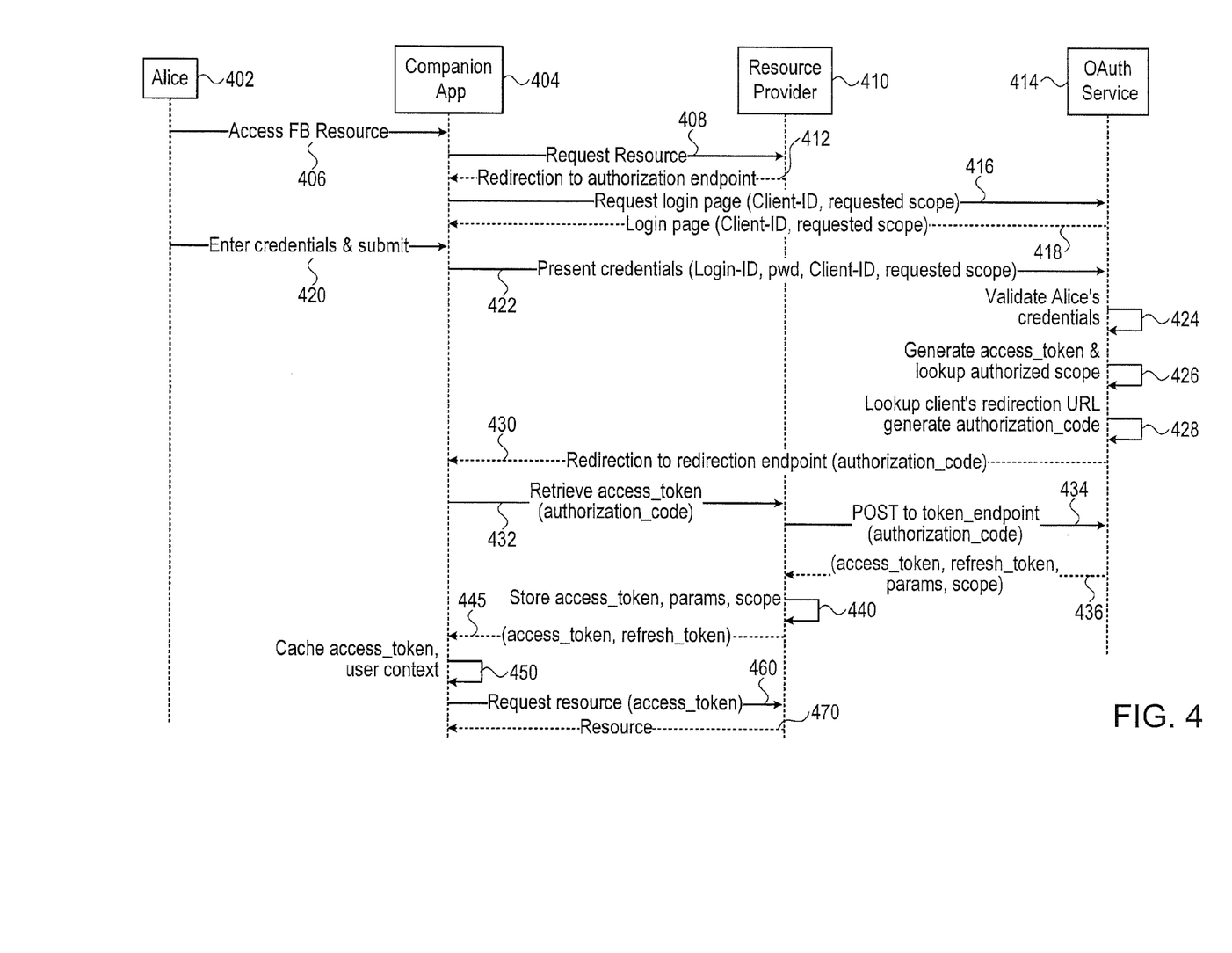
FIG. 4 is a data flow diagram showing a companion device authorization sequence for use in the system of FIG. 1C.

Reference is now made to FIG. 4, which is a data flow diagram showing a companion device authorization sequence for use in the system of FIG. 1C. FIG. 4 depicts, in greater detail, the first use case, use case 220 of FIG. 2. The use case 220 depicted in the data flow diagram of FIG. 4 depicts the user's 110 request authorization flow from a resource server. FIG. 4 illustrates a general flow of a resource authorization request that the application 140 running on the companion device 120 uses to access resource on a resource provider on behalf of a user 110. In FIG. 4 and the ensuing description, the user 110 is herein referred to as Alice 402, and the resource will be referred to as "FB".

It is appreciated that, in advance of the sequence depicted in FIG. 4, a developer of the application 140 running on the companion device 120 has already been registered with the OAuth Service of the resource to be requested (e.g., FB). The developer has obtained a Client-ID (an identifier that uniquely identifies a developer account) and an app-ID (unique app identifier), identified scopes (such as email address, friend's lists, pictures, videos) of resource groups that the developer intends the application 140 running on the companion device 120 to access on behalf of the users 110 of the application 140 (also referred to, herein after as "the app" 140).

It is also appreciated that in order for Alice 402 to be able to access the resource FB on the application 140 running on the companion device 120 (hereinafter the "companion app" 404), Alice 402 has an account setup with the resource provider, which uses the OAuth service. Those skilled in the art will appreciate that other approaches, besides using OAuth are possible. For example, and without limiting the generality of the foregoing, a combination of single sign on and resource provider based custom resource authorization mechanisms can be used. OAuth has been used as an example because it is well documented and a standard.

Alice 402, using the companion device 120 GUI, indicates a desire to access resource FB 406, the companion app 404. Companion app 404 makes an explicit request for the resource 408 from resource provider 410. Resource provider 410 responds to the companion app 404 with a redirection 412 to a URL for the OAuth service 414, and scope information that informs the OAuth service 414 which sets of resources are being requested. The resource provider who is accessing the companion app 120 can then choose to authorize the companion app 120 to access specific sets of resource. For example, the companion app 120 may only be authorized to access a subset of an initial set of requested scopes.

The companion app 404 then sends a Login Page request 416 to the OAuth service 414. In response, the OAuth service 414 sends Login Page 418 to the companion app 404. At this point, Alice 402 enters her credentials and submits them 420 to the companion app 404, which in turn then forwards the credentials submitted in step to the OAuth service 414 by forwarding a Present Credentials statement 422 to the OAuth service 414. It is appreciated that OAuth service 414 actually provides four different types of grants (see RFC 6749, tools.ietf.org/html/rfc6749). The mechanism discussed in the present example is an authorization grant of type authorization code. Persons of skill in the art will appreciate that all of these four mechanisms may also be used in implementing the present invention.

The OAuth service 414 validates Alice's presented credentials 424. After validation 424, the OAuth service 414 generates an access_token and looks up Alice's 402 authorized scope 426 within service FB. Once the OAuth service 414 determines Alice's 402 authorized scope 426 within service FB, the OAuth service 414 proceeds to look up Alice's redirection URL and generate an appropriate authorization code 428. Finally, the OAuth service 414 sends a redirection to redirection endpoint 430 containing an authorization_code to the companion app 404, based on the result of the look up of Alice's redirection URL and generate an appropriate authorization code 428.

In response to receiving the redirection to redirection endpoint 430 from the OAuth service 414, the companion app 404 then sends a retrieve access_token request 432 to the resource provider 410. The retrieve access_token request 432 includes the authorization_code. The resource provider 410, upon receiving the retrieve access_token request 432 with the properly generated authorization_code from the companion app 404, in turn sends a HTTP POST request 434, which contains the authorization_code to the token_endpoint hosted on the OAuth service 414. In response to receiving the HTTP POST request 434, which contains the valid authorization_code, the OAuth service 414 sends an access_token 436 to the resource provider 410. The resource provider 410 then stores the received access_token 440, and forwards 445 the access_token to the companion app 404.

The companion app 404 caches 450 the access_token. The companion app 404 then requests access 460 to the FB resource from the resource provider 410. The resource provider 410 then provides access 470 to the authorized resource on the FB service to the companion app 404.

Figure 5:
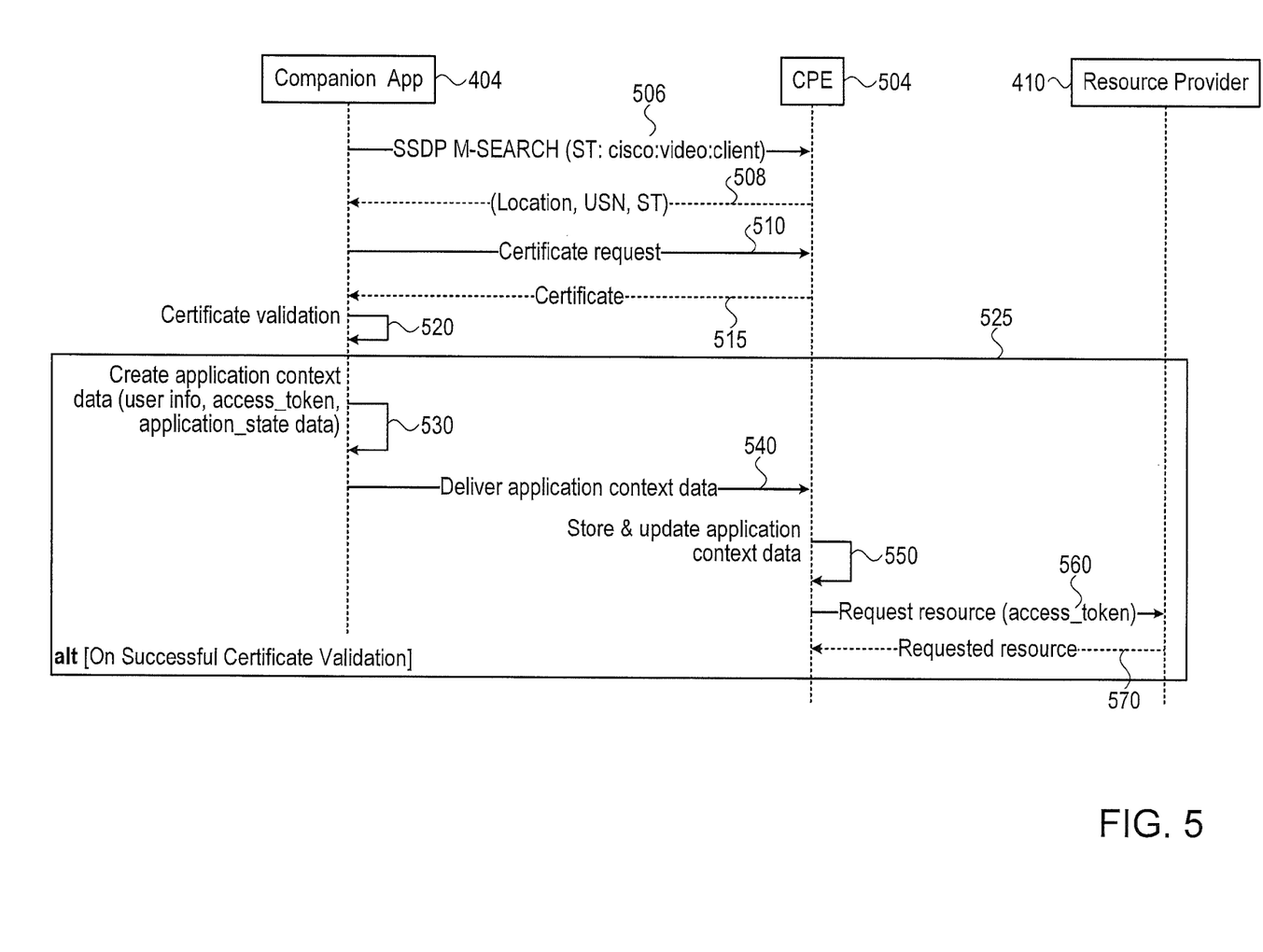
FIG. 5 is a data flow diagram showing a method for sharing application context in the system of FIG. 1C.

Reference is now made to FIG. 5, which is a data flow diagram showing a method for sharing application context in the system of FIG. 1C. FIG. 5 depicts, in greater detail, the second use case, use case 230 of FIG. 2. The use case 230 depicted in the data flow diagram of FIG. 5 depicts a method for sharing an application context between the companion app 404 and a CPE device 504 (which corresponds to CPE device 150 of FIGS. 1A and 1B). Continuing from where the discussion of FIG. 4 concluded, Alice's 402 companion device 120, which is running the companion app 404, now has an access_token, and is therefore able to access resource FB.

The companion app 404 performs a Simple Service Discovery Protocol (SSDP) M-SEARCH 506. As is known in the art, SSDP is a UDP based protocol, and M-SEARCH is a multicast search method used to discover available services on the network. In response to the M-SEARCH 506, the CPE device 504 sends a unicast addressed response 508, the response comprising an address and port number of the CPE device 504.

The companion app 404 then sends the CPE device 504 a certificate request 510 (i.e. a request for to receive a digital certificate), in response to which the CPE device 504 sends the companion app 404 a certificate 515. The companion app 404 then validates 520 the received certificate.

Once the received certificate has been validated in step 520, the companion app 404 and the CPE device 504 are able to initiate a secure communication session 525. Within the framework of the secure communication session 525, the companion app 404 creates application context data 530. Application context data 530 comprises, at least user information (such as user id, name); the authorization construct (such as: code to exchange and obtain access_token, token endpoint information, length of grant, ping interface for authorization refresh, keep-alive socket/port); and application_state data (such as resource or asset being requested, play position, total length of movie, other metadata as may be useful to the STB-app). The companion app 404 delivers 540 the application context data 530 to the CPE device 504. The CPE device 504 then stores and updates application data 550. Having stored and updated the application data 550, the CPE device 504 sends the access_token to the resource provider 510 in a request for the resource 560. The resource provider 510 then provides the requested resource 570 (e.g. FB) to the CPE device 504. It is appreciated that the user information described above is used to uniquely identify the user, so that the secure communication session 525 can be destroyed.

Figure 6:
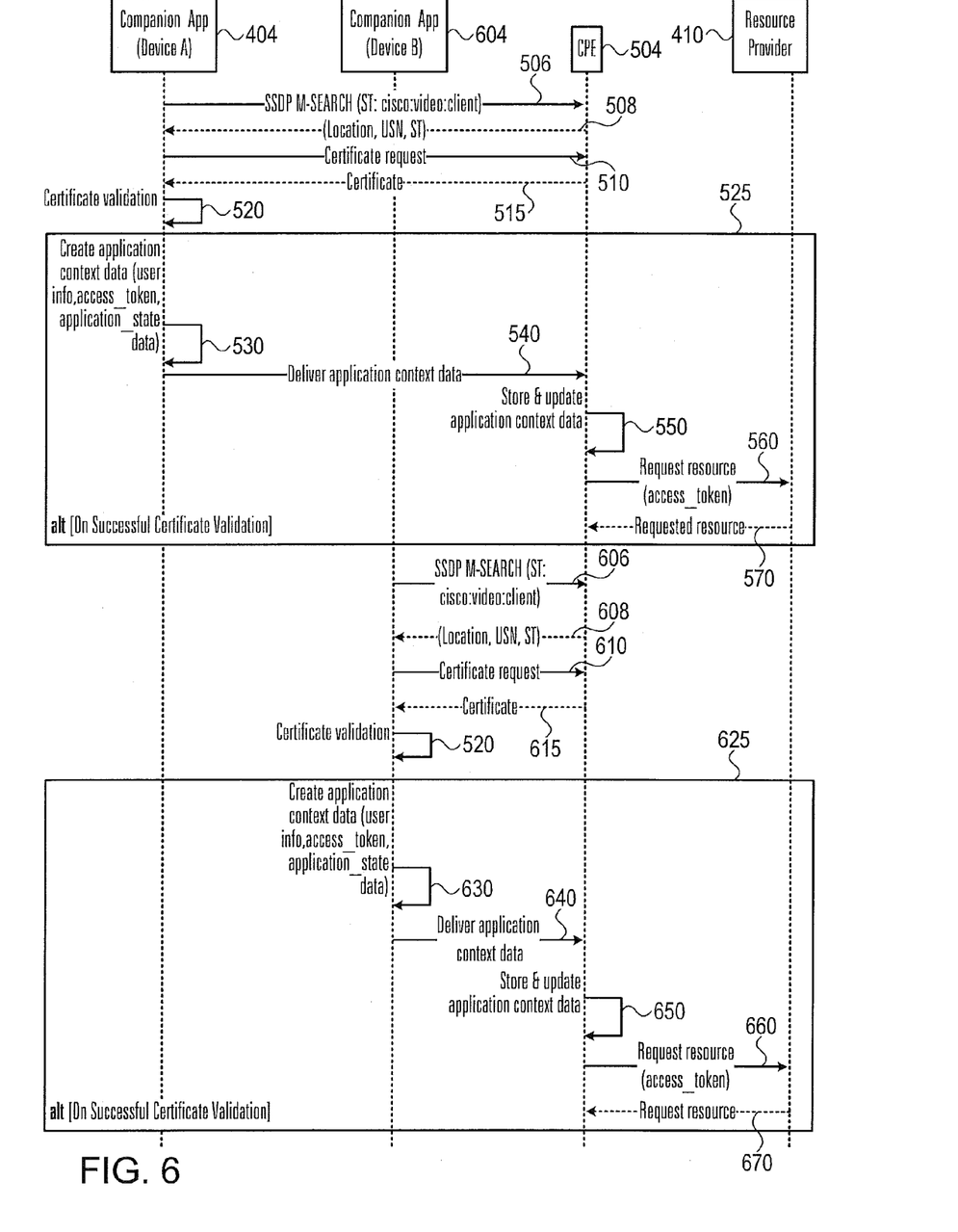
FIG. 6 is a data flow diagram showing a method for switching application context between two companion devices in communication with a single CPE device in the system of FIG. 1C.

Reference is now made to FIG. 6, which is a data flow diagram showing a method for switching application context between two companion devices 120 in communication with a single CPE device 150 in the system of FIG. 1C. FIG. 6 depicts, in greater detail, the third use case, use case 250 of FIG. 2. The use case 250 depicted in the data flow diagram of FIG. 6 depicts a method for switching application control on the CPE device 504 from the first companion app 404 to a second companion app 604.

In the first stage of the method depicted in FIG. 6, i.e. steps 506-570, the first companion app 404 performs the steps depicted in FIG. 5, in order to share its application context with the CPE device 504.

In the second stage of the method depicted in FIG. 6, a second companion app 604 (which is functionally similar to companion app 404) performs the steps 606-670, which correspond, respectively to steps 506-570 depicted in FIG. 5, and performed by the first companion app 404. It is appreciated that the secure communication session 525 created in order to share application context is destroyed when the secure communication session 625 is created by the second companion app 604 performing the steps 606-670. All metadata and state pertaining to the first secure communication session 525 is purged and discarded. In some scenarios, the companion app 604 may make explicit request to OAuth server 414 to destroy the "access_token" associated with the authorization grant provided by the resource provider to the CPE device app 180.

Figure 7:
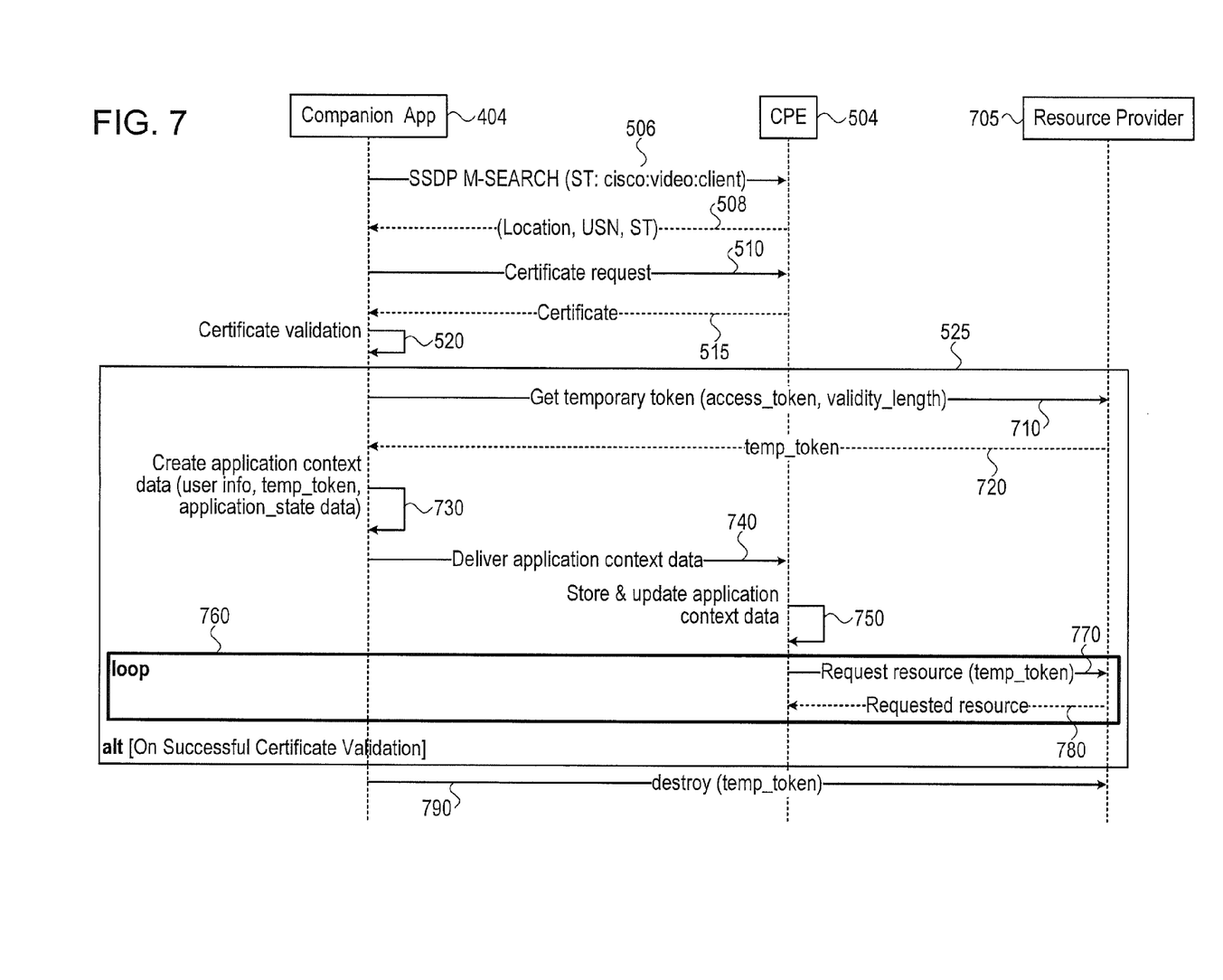
FIG. 7 is a data flow diagram showing an alternative method to the one described in FIG. 5 for sharing application context.

Reference is now made to FIG. 7, which is a data flow diagram showing an alternative method to the one described in FIG. 5 for sharing application context. In the alternative method of FIG. 7, the secure communication session 525 is initiated as described above, with reference to FIG. 5. The companion app 404 first send the resource provider 705 a get request for a temporary token 710, comprising an access token and validity length from the temporary token. The resource provider 705 responds, in step 720, by sending the companion app 404 the requested temporary token. Then, the companion app 404, rather than performing the step of creating application context data 530, creates application context data and generates application context data 730 comprising at least user information (as described above); a temp_token (temporary token); and application_state data. The companion app 404 delivers 740 the application context data 730 comprising the temp_token to the CPE device 504. The CPE device 504 then stores and updates application data 750 comprising the temp_token.

In a loop 760, the CPE device 504 requests the desired resource 770 from a resource provider 705. The request for the desired resource 770 comprises the temp_token. The desired resource is delivered 780 by the resource provider 705 to the CPE device 504. This loop is repeated for each resource request 770-resource delivery 780.

When the loop 760 ends, the companion app 404 sends a destroy(temp_token) 790 instruction to the resource provider 705, thereby causing the temporary token to be destroyed, and preventing further use of the resource on the CPE by either the user 402 (FIG. 4) or someone else pretending to be the user 402 (FIG. 4).

This scheme, as presented in FIG. 7 presupposes that the resource provider 705 has been "customized" to support the use of the temporary token generated in step 730.

Figure 8:
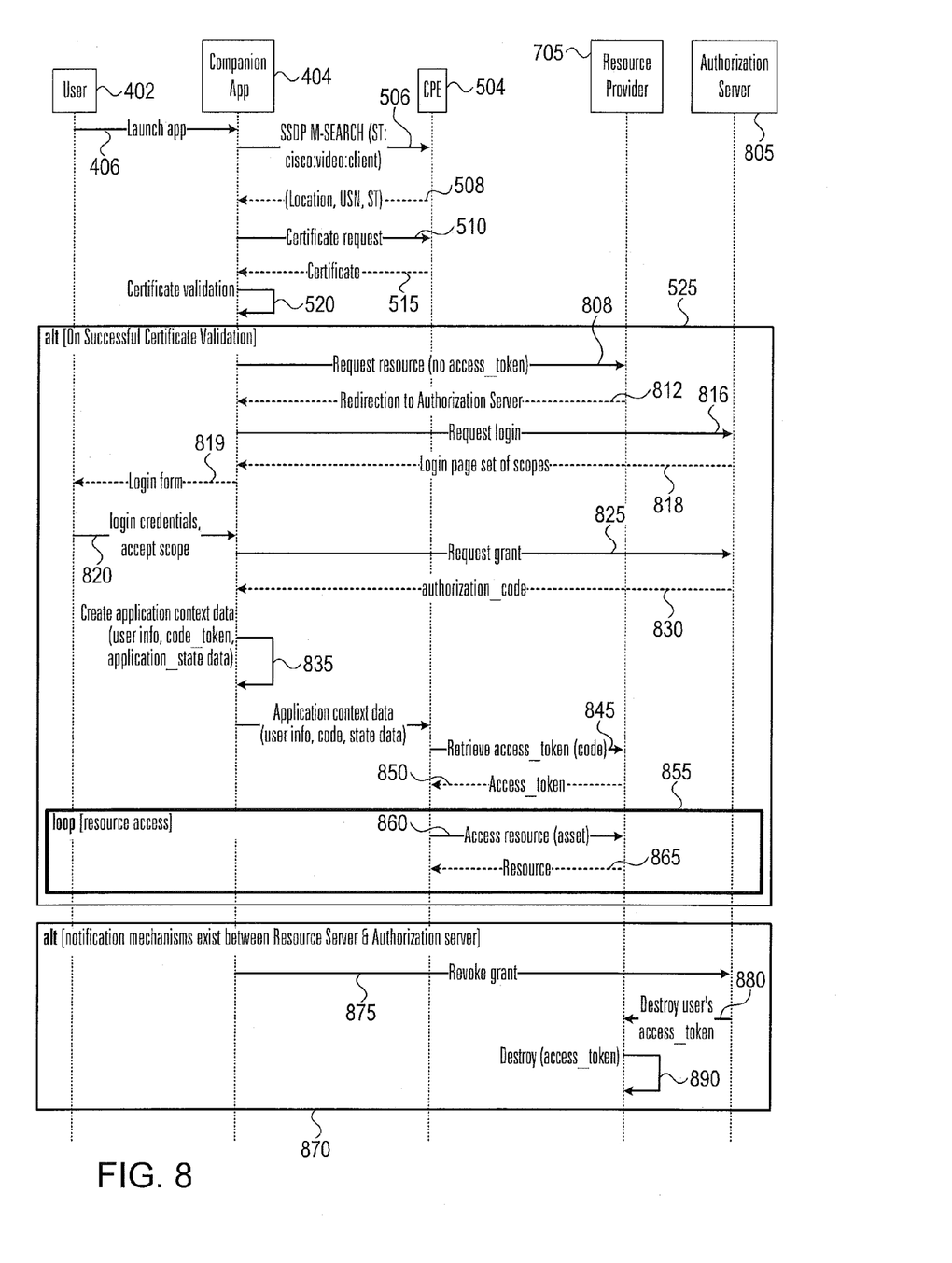
FIG. 8 is a data flow diagram showing a second alternative method to the one described in FIG. 5 for sharing application context.

Reference is now made to FIG. 8, which is a data flow diagram showing a second alternative method to the one described in FIG. 5 for sharing application context. In the alternative method of FIG. 8, (as was noted above with reference to FIG. 4), the CPE device 504 is granted its own access token by the resource provider 705, and thus the companion app 404 does not need to share the access token with CPE device 504.

The user 402 launches 406 the consumer app 404. The secure communication session 525 is initiated as described above, with reference to FIG. 5. It is appreciated, however, that in FIG. 8, the steps of FIG. 4 have not yet been executed, and therefore, there is a need to receive the access token, as described above, with reference to FIG. 4. However, in the method described here in FIG. 8, the access token is received within the secure communication session 525, as described now.

Once the secure communication session 525 is established, the companion app 404 requests the resource 808 from resource provider 705. As was noted above, the resource request 808 is not accompanied by the access token. The resource provider 705 responds to the companion app 404 with a redirection 812 to the authorization server 805. The following data is passed to the OAuth Server 805 when an authorization request is made: scope; state; and redirection_URL. Scope defines the resource set that companion app 404 is requesting on behalf of the resource provider 705. State comprises data that the companion app 404 requires after the OAuth server 805 has authenticated the resource provider 705 and redirects back to the resource provider's 705 redirection_URL.

The companion app 404 then sends a Login Page request 816 to the authorization server 805. In response, the authorization server 805 sends the companion app 404 Login Page 818. Upon receipt of the Login Page 818, the companion app 404 presents the user 402 with a login form 819, and waits until the information required by the login form 819 is provided by the user 402. It is appreciated that the Login Page 818 and the login form 819 comprises the same form/page. However, in order to distinguish in the figure and this description between steps 818 and 819, different terms are used in the description. When the required login credentials are provided 820 by the user 402 to the companion app 404, the companion app 404 relays the login credentials to the authorization server 805 with a request for granting access 825 to the desired resource. It is appreciated that the request for granting access 825 in the discussion of FIG. 8 is the same operation as described in the steps of presenting credentials 422; validating the credentials 424; and so forth, through redirection to redirection endpoint 430 in FIG. 4. For ease of depiction and description, however, steps 422-430 have been abbreviated with the step of the request for granting access 825 in FIG. 8.

The authorization server 805 replies to the companion app 404 with an authorization code 830. The companion app 404 then creates application context data 835. Application context data 835 comprises (as described above), at least user information; the authorization code 830; and application_state data. The companion app 404 delivers 840 the application context data 835 to the CPE device 504.

The CPE device 504 then submits a retrieve access token request 845 comprising the authorization code 830 to the resource provider 705. The resource provider 705 responds by sending 850 the access token to the CPE device 504.

The CPE device 504 now is able, in a loop 855, to access the desired resource on the resource provider 705. This is achieved by the CPE device 504 sending access resource requests 860 to the resource provider 705, and in response to the these requests 860, the resource provider 705 provides the requested resource 865.

In the mechanism of FIG. 8, the companion app 404 has the ability to end the loop between the CPE device 504 and the resource provider 705. In such an eventuality, the companion app 404 sends a revoke grant request 875 to the authorization server 805. In response to the revoke grant request 875 of the companion app 404, the authorization server 805 instructs the resource provider 705 to destroy the access token 880 of the CPE device 504. In response to the instruction to destroy the access token 880, the resource provider 705 destroys 890 the access token. Should the CPE device 504 now attempt to send an access resource request 860 to the resource provider 705, the resource provider 705 will now be unable to verify the validity of the access token in the access resource request 860. Accordingly, the resource provider 705 will not provide the CPE device 504 with the resource requested in the access resource request 860.

Figure 9:
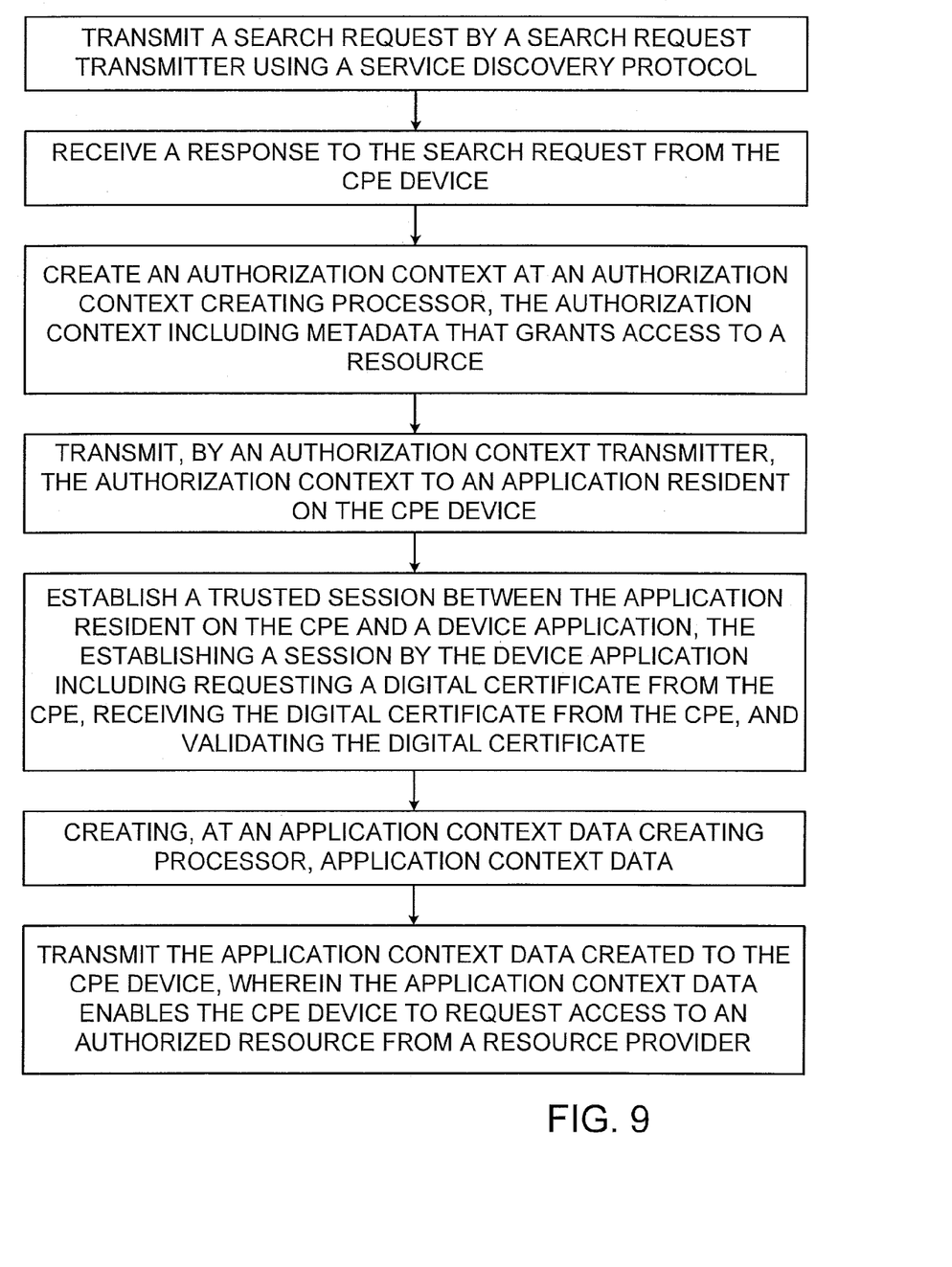
FIG. 9 is a flowchart of a method of operation of one embodiment described herein.

Reference is now made to FIG. 9, which is a flowchart of a method of operation of one embodiment described herein. FIG. 9 is believed to be self-explanatory in light of the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A companion device based system for sharing an application context and authorization context between a consumer premises equipment (CPE) device comprising at least one of a television or a set top box and a companion device comprising at least one of a hand held computing device, a smart phone, a tablet, or a laptop or a personal computer, the companion device system comprising:
   a companion device search request transmitter for transmitting a search request using a service discovery protocol;
   a companion device receiver for receiving a response to the search request from the CPE device;
   a companion device authorization context creating processor which creates an authorization context, the authorization context comprising metadata that grants access to a resource;
   a companion device authorization context transmitter which transmits the authorization context to an application resident on the CPE device;
   a companion device application that establishes a trusted session between the application resident on the CPE and the device application, the device application comprising:
      a companion device certificate requester which requests a digital certificate from the CPE;
      a companion device certificate receiver for receiving the digital certificate from the CPE; and
      a companion device certificate validator which validates the digital certificate;
   a companion device application context data creating processor which creates application context data; and
   a companion device application context data transmitter which transmits the application context data created to the CPE device,
   wherein the application context data enables the CPE device to request access to an authorized resource from a resource provider.

2. The system of claim 1 wherein the search request is performed using a network resource discovery protocol.

3. The system of claim 2 wherein the network resource discovery protocol comprises the Simple Service Discovery Protocol (SSDP).

4. The system of claim 2 wherein the network resource discovery protocol service discovery protocol comprises the Universal Plug and Play (UPNP) protocol.

5. The system of claim 1 wherein the application context data comprises at least:
   user information;
   authorization context data; and
   application state data.

6. The system of claim 1 wherein user credentials are entered on the companion device and not on the CPE.

7. The system of claim 1 wherein the system unifies resources authorization grant on the companion device and at least one other companion device through a single authentication sequence.

8. The system of claim 1 wherein the trusted session comprises a session with implicit trust between the application resident on the CPE and the device application.

9. The system of claim 1 wherein the companion device determines when to destroy the session.

10. The system of claim 9 wherein the companion device resumes an application state which existed prior to establishing the session upon destruction of the session.

11. A consumer premises equipment (CPE) device system comprising at least one of a television or a set top box for sharing an application context and authorization context between the CPE device and a companion device comprising at least one of a hand held computing device, a smart phone, a tablet, or a laptop or a personal computer, the CPE device system comprising:
   a CPE device response transmitter which transmits to the companion device, in response to receipt of a search request using a service discovery protocol, a response comprising: a location; a unique service name; and a search target value;
   a CPE device certificate transmitter, which transmits a digital certificate to the companion device, in response to a request for the certificate;
   a CPE device application context data receiver which receives application context data from the companion device, the application context data comprising an application access token; and
   a CPE device resource requester which sends the application access token to a resource provider.

12. The system of claim 11 wherein the CPE device is operative to receive access to the requested resource from the resource provider, in response to receipt of the access token by the resource provider.

13. The system of claim 11 wherein the application context data further comprises:
   user information; and
   application state data.

14. The system of claim 11 wherein user credentials are entered on the companion device and not on the CPE.

15. The system of claim 11 wherein the system unifies resources authorization grant on the companion device and at least one other companion device through a single authentication sequence.

16. The system of claim 11 wherein the CPE determines when to destroy the session.

17. A method for a companion device comprising at least one of a hand held computing device, a smart phone, a tablet, or a laptop or a personal computer to share an application context and authorization context with a consumer premises equipment (CPE) device comprising at least one of a television or a set top box, the method comprising:
   transmitting a search request by a companion device search request transmitter using a service discovery protocol;
   receiving a response at the companion device to the search request from the CPE device;
   creating an authorization context at a companion device authorization context creating processor, the authorization context comprising metadata that grants access to a resource;
   transmitting, by a companion device authorization context transmitter, the authorization context to an application resident on the CPE device;
   establishing, by the companion device, a trusted session between the application resident on the CPE and a device application, the establishing a session by the device application comprising:

requesting, by the companion device, a digital certificate from the CPE;

receiving, at the companion device, the digital certificate from the CPE; and validating, by the companion device, the digital certificate;

creating, at a companion device application context data creating processor, application context data; and transmitting the application context data created at the companion device, to the CPE device, wherein the application context data enables the CPE device to request access to an authorized resource from a resource provider.

18. The method of claim 17 wherein the application context data comprises at least:

user information;

authorization context data; and application state data.

19. The method of claim 17 wherein the companion device determines when to destroy the session.

20. A method for a consumer premises equipment (CPE) device comprising at least one of a television or a set top box to share an application context and authorization context with a companion device comprising at least one of a hand held computing device, a smart phone, a tablet, or a laptop or a personal computer, the method comprising:

transmitting, in response to receipt of a search request using a service discovery protocol, by a CPE device response transmitter, a response to the companion device, the response comprising: a location; a unique service name; and a search target value;

transmitting a digital certificate by a CPE device certificate transmitter to the companion device, in response to a request for the certificate;

receiving, at a CPE device application context data receiver, application context data from the companion device, the application context data comprising an application access token; and sending, by the CPE device, the application access token to a resource provider.

* * * * *